United States Patent
Agarwal et al.

(10) Patent No.: US 7,477,852 B2
(45) Date of Patent: Jan. 13, 2009

(54) OPTICAL RECEIVER APPARATUS AND METHOD

(75) Inventors: Anjali Agarwal, Matawan, NJ (US); Andreas Benz, Erlangen (DE); Sethumadhavan Chandrasekhar, Matawan, NJ (US); Peter J. Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 501 days.

(21) Appl. No.: 11/047,011

(22) Filed: Jan. 31, 2005

(65) Prior Publication Data

US 2006/0171720 A1 Aug. 3, 2006

(51) Int. Cl.
*H04B 10/00* (2006.01)

(52) U.S. Cl. .................. 398/210; 398/208; 398/202; 398/203; 398/204

(58) Field of Classification Search .......... 398/183, 398/188, 202–214
See application file for complete search history.

(56) References Cited

U.S. PATENT DOCUMENTS

| | | | | | |
|---|---|---|---|---|---|
| 4,718,121 | A * | 1/1988 | Epworth | ...................... | 398/203 |
| 5,075,793 | A * | 12/1991 | Schiffner | ...................... | 398/203 |
| 5,115,332 | A * | 5/1992 | Naito et al. | ................... | 398/202 |
| 5,181,136 | A * | 1/1993 | Kavehrad et al. | ............ | 398/203 |
| 5,323,258 | A * | 6/1994 | Tsushima et al. | ............ | 398/203 |
| 5,463,461 | A * | 10/1995 | Horiuchi et al. | .............. | 356/484 |
| 5,586,101 | A * | 12/1996 | Gage et al. | ............. | 369/124.12 |
| 6,271,959 | B1 * | 8/2001 | Kim et al. | ..................... | 359/325 |
| 6,362,911 | B1 * | 3/2002 | Lee et al. | ..................... | 398/208 |
| 6,731,881 | B2 * | 5/2004 | Nomura | ....................... | 398/135 |
| 6,775,484 | B1 * | 8/2004 | Pfeiffer | ....................... | 398/204 |
| 6,834,165 | B2 * | 12/2004 | Feng | ............................ | 398/202 |
| 7,092,644 | B2 * | 8/2006 | Davidson | ..................... | 398/202 |
| 7,110,677 | B2 * | 9/2006 | Reingand et al. | .............. | 398/98 |
| 7,130,545 | B2 * | 10/2006 | Lou et al. | ..................... | 398/198 |
| 7,162,165 | B2 * | 1/2007 | Szafraniec | .................... | 398/202 |
| 7,184,672 | B2 * | 2/2007 | Forbes et al. | ................. | 398/208 |
| 7,200,344 | B1 * | 4/2007 | Hoshida | ....................... | 398/202 |
| 7,209,670 | B2 * | 4/2007 | Fludger et al. | .............. | 398/205 |
| 7,233,430 | B2 * | 6/2007 | Caplan | ........................ | 359/325 |
| 7,266,307 | B2 * | 9/2007 | Shpantzer et al. | ........... | 398/193 |
| 7,333,732 | B2 * | 2/2008 | Domagala | .................... | 398/155 |
| 7,373,091 | B2 * | 5/2008 | Moeller | ....................... | 398/204 |
| 2005/0117915 | A1 * | 6/2005 | Miyazaki | ..................... | 398/188 |
| 2005/0260000 | A1 * | 11/2005 | Domagala | .................... | 398/188 |
| 2006/0140636 | A1 * | 6/2006 | Marazzi et al. | ............. | 398/147 |
| 2006/0171720 | A1 * | 8/2006 | Agarwal et al. | ............. | 398/186 |
| 2007/0206898 | A1 * | 9/2007 | Wang et al. | .................... | 385/24 |

OTHER PUBLICATIONS

Peter J. winzer, Degradations in balanced DPSK receivers, IEEE Photonics Technology Letters, vol. 15, No. 9, Sep. 2003, 1282-1284.*
G. Bosco et.al., The impact of receiver imperfections on the Performance of optical direct-Detection DPSK, IEEE J. of Lightwave Technology, vol. 23, No. 2, Feb. 2005, 842-848.*
Dennis T.K. Tong et.al., Optoelectronic phase-locked loop with balanced photodetection for clock recovery in high-speed optical time-division-multiplexed systems, vol. 12, No. 8, Aug. 2000, 1064-1066.*
European Search Report dated Dec. 5, 2006 for European Patent Application No. 06250270.3-2415.

* cited by examiner

*Primary Examiner*—Agustin Bello

(57) ABSTRACT

A method and apparatus for receiving narrowband filtered optical PSK signals, including converting PSK optical signals into intensity-modulated signals at a receiver, and introducing a desired amplitude imbalance between the first and the second intensity-modulated signals to improve receiver performance.

8 Claims, 4 Drawing Sheets

OPTICAL RECEIVER APPARATUS AND METHOD

BACKGROUND OF THE INVENTION

1. Field of the Invention

The present invention relates generally to optical transmission, and more particularly to methods and apparatus for receiving phase shift keyed (PSK) optical signals.

2. Description of Related Art

The use of PSK modulation, and in particular, differential phase shift keying (DPSK) has been shown to provide improved performance as compared to other modulation formats. DPSK has been shown to provide a 3-dB enhanced receiver sensitivity over conventionally used on/off keying (OOK) modulation formats. Such improved receiver sensitivity allows systems employing DPSK modulation to transmit over longer distances without signal regeneration.

DPSK signal transmission has also been found to be more robust to narrowband optical filtering as compared to other modulation formats. Such characteristics make DPSK modulation a desirable format for optically-routed networks that incorporate multiple optical add/drop multiplexers (OADM) or optical crossconnects (OXC).

In order to fully exploit the benefits of phase shift keyed (PSK) modulation techniques, PSK optical receivers are typically built using an optical delay interferometer followed by a balanced photoreceiver. Prior art teachings suggest that optimum receiver performance is obtained if the balanced receiver is perfectly amplitude-balanced. However, for systems incorporating one or more optical filter devices (e.g. OADMs or OXCs), it has been found that use of perfectly amplitude-balanced reception of PSK signals results in degraded receiver performance. Specifically, the performance is degraded in terms of the optical signal-to-noise ratio (OSNR) that is required to achieve a desired bit-error-rate (BER) upon detection of a PSK signal.

BRIEF SUMMARY OF THE INVENTION

The present invention provides a method and apparatus for improved reception of optical PSK signals transmitted in systems employing narrowband optical filtering. The improved reception is achieved by converting optical PSK signals at a receiver into two intensity-modulated signals and introducing a desired amplitude imbalance between the two signals. Introduction of such an amplitude imbalance improves receiver performance for narrowband filtered PSK signals by effectively mitigating any degraded receiver performance due to the narrowband optical filtering and reducing the optical signal-to-noise ratio required for substantially error-free transmission.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings.

DETAILED DESCRIPTION OF THE INVENTION

Figure 1:
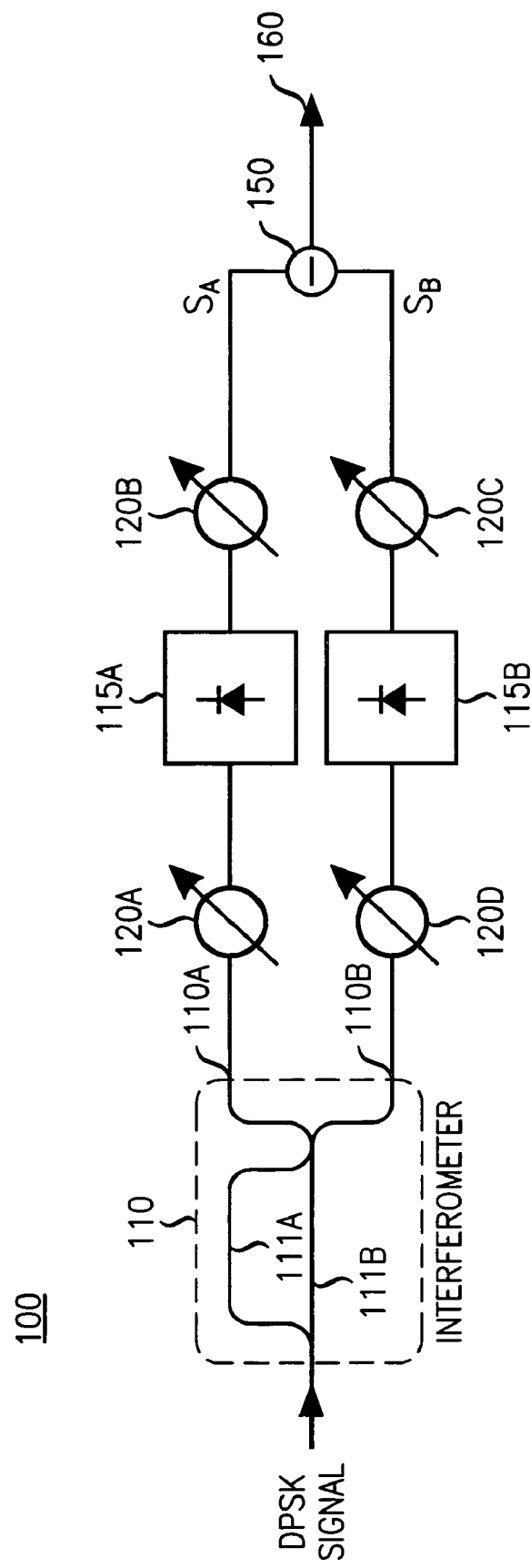
FIG. 1 is a schematic diagram of a receiver apparatus which can be used in accordance with embodiments of the invention.

FIG. 1 is a schematic diagram of an optical receiver apparatus 100 in accordance with aspects of the invention for receiving narrowband filtered optical PSK signals. As used herein, "narrowband filtered" or "strongly filtered" optical signals refer to optical signals carrying information at a data rate of, for example, B gigabits/s that are optically filtered with an optical filter of a bandwidth of about B gigahertz (i.e. about one times the data rate). As a specific example, a "narrowband" optical filter having a bandwidth of 40 gigahertz would "strongly" filter a CSRZ-DPSK optical signal carrying information at 40 gigabits/s.

The optical receiver apparatus 100 comprises an interferometer 110 for receiving PSK signals. The interferometer 110 is preferably a Mach-Zehnder delay interferometer (MZDI) that provides a delay of about one bit between the arms 111A, 111B of the interferometer 110. The interferometer 110 converts incoming PSK signals into a first and a second optical intensity-modulated signal (e.g. at the constructive and destructive output ports of the MZDI). The first and second optical intensity-modulated signals are output from the interferometer 110 on output ports 110A and 110B, respectively.

Two photodiodes 115A, 115B are respectively coupled to the output ports 110A, 110B of the interferometer 110. The photodiodes 115A, 115B are used to differentially detect the first and second optical intensity-modulated signals and generate electrical intensity-modulated signals (i.e. generate photocurrents representative of the first and second optical intensity-modulated signals). The photodiodes 115A, 115B are preferably identical InP waveguide PIN photodiodes.

One or more amplitude attenuator/gain elements 120A, 120B, 120C, 120D are used to control or adjust the power (i.e. amplitude) of at least one of either the first and second optical intensity-modulated signals from the interferometer 110, or the first and second electrical intensity-modulated signals from the photodiodes 115A, 115B. The attenuator/gain elements 120A, 120D can be, for example variable optical attenuators, variable optical gain device, or any device capable of controlling the power of the first and/or second optical intensity-modulated signals. The attenuator/gain elements 120B, 120C can be, for example, electrical variable gain amplifiers, variable electrical attenuators, or any device capable of controlling the power of the first and/or second electrical intensity-modulated signals.

The attenuator/gain elements 120A, 120B, 120C, 120D are preferably used to introduce an amplitude imbalance between the first and second optical intensity-modulated signals, and/or between the first and second electrical intensity-modulated signals. It is understood that for a perfectly balanced receiver, i.e. a receiver that under ideal PSK modulation and broad optical filtering yields equal amplitudes of the first and second electrical intensity-modulated signals, a "natural" imbalance may exist between the first and second intensity-modulated signals (optical or electrical) once the received PSK signals are subject to narrowband filtering. Thus, in accordance with aspects of the invention, the introduction of an amplitude imbalance between first and second intensity-modulated signals (optical or electrical) includes introducing an imbalance to "balanced" signals, and/or adding to or modifying any "natural" (i.e. existing) imbalance to obtain improved (e.g. optimum) receiver performance.

It will be appreciated by those skilled in the art that introduction of the amplitude imbalance includes changing the amplitude ratio of the first and second optical intensity-modulated signals, and/or the first and second electrical intensity-modulated signals. By changing the ratio of the amplitudes of the first and second electrical intensity-modulated signals the natural distribution of optical energy between first and second electrical intensity-modulated signals that is imprinted by narrowband optical filtering is reshaped in a way that a receiver output signal (e.g receiver output signals 160, 280, discussed below) becomes better suited for detection.

The overall opto-electronic conversion factor can be given by $S_A$ and $S_B$, respectively. The opto-electronic conversion factor $S_A$ or $S_B$ is defined as the ratio of the optical signal amplitude of an optical intensity-modulated signal (e.g. at output 110A) to the electrical signal amplitude of an electrical intensity-modulated signal (e.g. before the differential amplifier 150, discussed below). A perfectly balanced receiver, as discussed above, is characterized by $S_A = S_B$. $S_A$ corresponds to the constructive output port of the delay interferometer, and $S_B$ corresponds to the destructive port. Any imbalance in a receiver setup can then be quantified using the receiver imbalance $\beta_A$ as:

$$\beta_A = (S_A - S_B)/(S_A + S_B),$$

where $\beta_A = 0$ corresponds to a perfectly balanced case.

A differential linear amplifier 150 or the like is preferably used to combine the first and second electrical intensity-modulated signals to generate a receiver output signal 160 representative of the received PSK signal.

Figure 2:
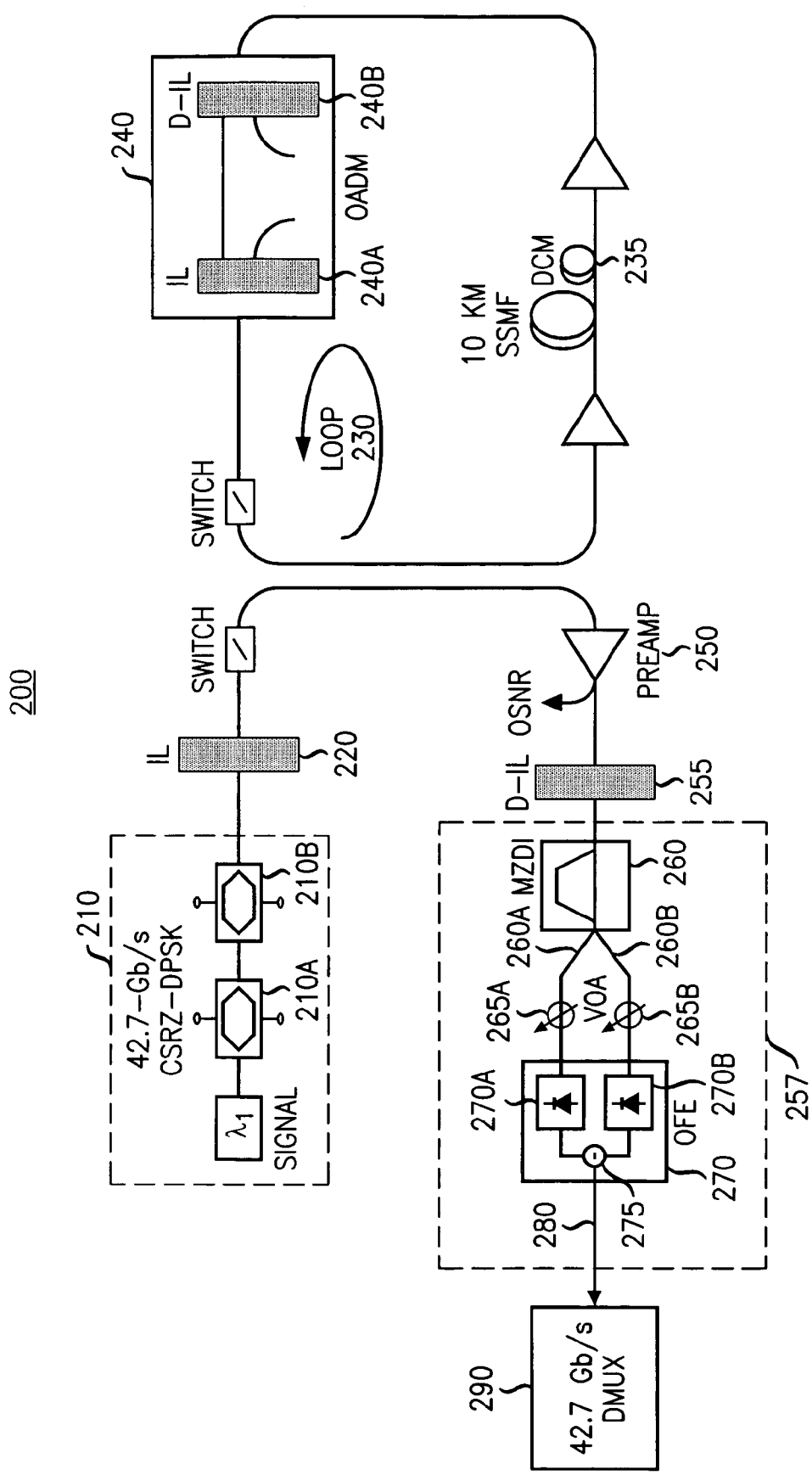
FIG. 2 is a schematic diagram of an experimental optical transmission system including a receiver apparatus according to one embodiment of the invention.

Aspects of the present invention were tested using the experimental transmission system 200 shown in FIG. 2. A transmitter 210 comprising two LiNbO$_3$ Mach-Zehnder modulators (MZMs) in series was used to generate a carrier-suppressed return-to-zero (CSRZ-DPSK) (i.e. a 67% return-to-zero DPSK signal) modulated single wavelength channel at 1550.4 nm. The first modulator 210A was driven by a 21.3-GHz clock, and acted as a pulse carver, for generating 67% RZ pulses. By driving the second modulator 210B at the null point, data was imposed as a phase modulation.

While the enhanced forward error correction (FEC) data rate (which has a 7% overhead, similar to standard FEC) was used in the experimental testing, FEC was actually not implemented in these experiments.

A 100-to-50-GHz optical interleaver (IL) 220 (with a 3-dB bandwidth of ~44 GHz) was used after the transmitter to provide prefiltering of the CSRZ-DPSK signal.

A re-circulating loop 230 comprised a single 10-km span of SSMF fiber followed by a slope-matched dispersion compensating module (DCM) 235 that provided full dispersion compensation. The re-circulating loop 230 further comprised an OADM 240 having an IL 240A and a de-interleaver (D-IL) 240B connected back-to-back, which emulates a severely filtered path through an OADM node.

An EDFA pre-amplifier 250 was used at the receiver side of the system followed by a 50-to-100-GHz D-IL 255. A tunable dispersion compensator (TDC) (not shown) was used to bring the net dispersion of the CSRZ-DPSK signal to about zero.

A receiver 257 was coupled to the re-circulating loop 230 and included a MZDI 260 with a 1-bit delay (23.4 ps) between the two arms, variable optical attenuators 265A, 265B, and an optical front end (OFE) 270. The MZDI 260 was used to convert the incoming CSRZ-DPSK signal into first and second optical intensity-modulated signals at the two output ports 260A, 260B (depending on the phase difference between adjacent bits). Those skilled in the art will appreciate that maximum power appears at one output port (i.e. the "constructive" port) when there was no phase change between adjacent bits of the CSRZ-DPSK signal, and at the other port (i.e. the "destructive" port) when the phase in adjacent bits differs by $\pi$.

The optical power levels of the first and second optical intensity-modulated signals were adjusted using the variable optical attenuators 265A, 265B to introduce a desired amplitude imbalance between the first and second optical intensity-modulated signals.

The OFE 270, comprising two identical InP waveguide PIN photodiodes 270A, 270B followed by a differential linear amplifier 275, was used to detect the first and second optical intensity-modulated signals and generate a receiver output signal 280.

The average photocurrent at both photodiodes 270A, 270B was monitored. The receiver output signal 280 was then demultiplexed from 42.7 Gb/s to 10.7 Gb/s using a commercial electronic demultiplexer 290, and BER was measured. In loop operation, the measured BER was an average over the four 10.7 Gb/s tributaries.

Figure 3:
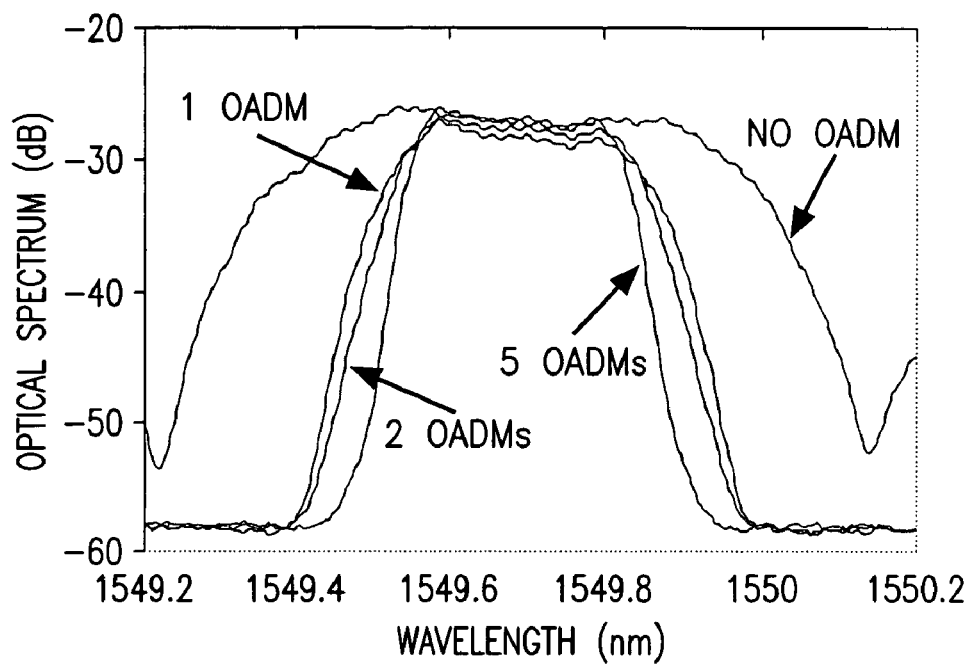
FIG. 3 is a plot showing the optical spectra of a carrier suppressed return-to-zero differential phase shift keyed (CSRZ-DPSK) signal after transmission through zero, one, two and five optical add-drop multiplexers (OADMs)

FIG. 3 shows the optical spectrum of the CSRZ-DPSK signal after zero, one, two, and five OADMs, illustrating the spectral narrowing due to filter concatenation. The interleavers 240A, 240B used in the experimental transmission system 200 of FIG. 2 were standard commercially available 10-Gb/s interleavers and third-order Gaussian filters with a 3-dB and 20-dB bandwidth of ~44 GHz and 62 GHz, respectively.

The impact of an amplitude imbalance on strongly filtered CSRZ-DPSK was studied, the performance of the experimental transmission system 200 of FIG. 2 was assessed in terms of the optical signal-to-noise ratio (OSNR) required to achieve a target BER of $10^{-3}$ (i.e. the threshold for error-free operation (corrected BER of $10^{-16}$ or better using enhanced FEC)).

An amplitude imbalance between the first and second optical intensity-modulated signals input into the OFE 270 was introduced by adjusting the optical power of the signals using attenuators 256A, 256B in front of the OFE 270. The amplitude imbalance at the OFE 270 can be defined in terms of the imbalance ($\beta_I$) in time-averaged photodiode currents as:

$$\beta_I = (I_{cons} - I_{des})/(I_{cons} + I_{des}),$$

where $I_{cons}$ and $I_{des}$ are the average photocurrents resulting from the first and second electrical intensity-modulated signals from the photodiodes 270A, 270B. For $I_{cons} = I_{des}$, $\beta_I = 0$ and photocurrent balanced detection is achieved. Those skilled in the art will appreciate that a positive (negative) $\beta_I$ corresponds to an emphasized signal from the constructive (destructive) port. In light of the above teachings, it is understood that emphasizing a signal can either occur naturally due to narrowband optical filtering, or intentionally due to varying $\beta_A$. For, $\beta_I = +1$ ($\beta_I = -1$) single-ended detection of the constructive (destructive) port is achieved.

Figure 4:
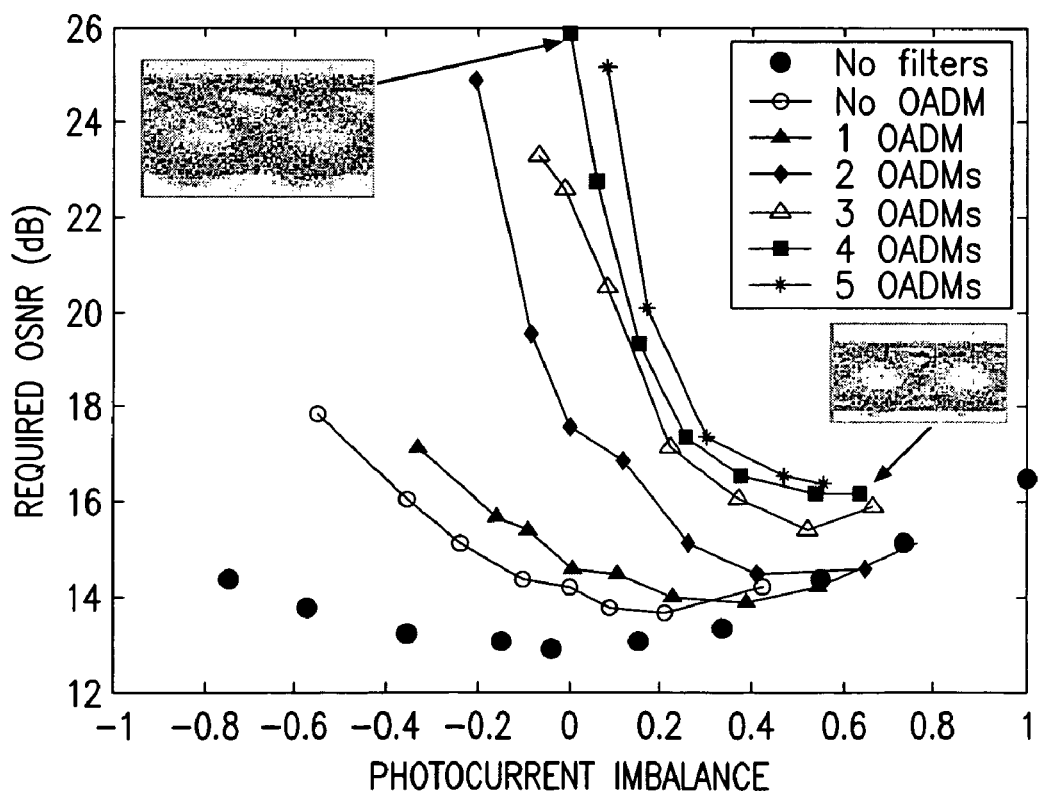
FIG. 4 is a plot showing the OSNR required to achieve a bit error rate (BER) of about $10^{-3}$ (Required OSNR) vs. photocurrent imbalance for various OADM concatenations.

The required OSNR ($OSNR_{Req}$) (i.e. the ratio between the total signal power of the received CSRZ-DPSK signal divided by the amplified spontaneous emission (ASE) measured in 0.1 nm bandwidth) was obtained by degrading the received OSNR by loading ASE noise before the pre-amplifier 250 until the measured BER degraded to $10^{-3}$. FIG. 4 shows the $OSNR_{Req}$ of the CSRZ-DPSK signal as a function of the photocurrent imbalance ($\beta_I$) for multiple passes through the OADM 240. The "No filters" curve corresponds to the case when there are no interleavers at the transmitter or at the receiver (sometimes referred to as the "back-to-back" case). The "No-Filters" curve represents performance that is obtainable under minimal optical filtering, where the $OSNR_{Req}$ slowly rises for both positive and negative $\beta_I$. The "No OADM" curve corresponds to the case when the interleavers 222, 255 at the transmitter 210 and receiver 257 are included. As the number of OADM nodes increases, the $OSNR_{Req}$ rises rapidly when the receiver 257 was balanced. The performance degrades even further for negative $\beta_I$. Positive $\beta_I$ results in significantly improved receiver performance. This improvement is also evident in the electrical eye diagrams inset in FIG. 4.

Figure 5:
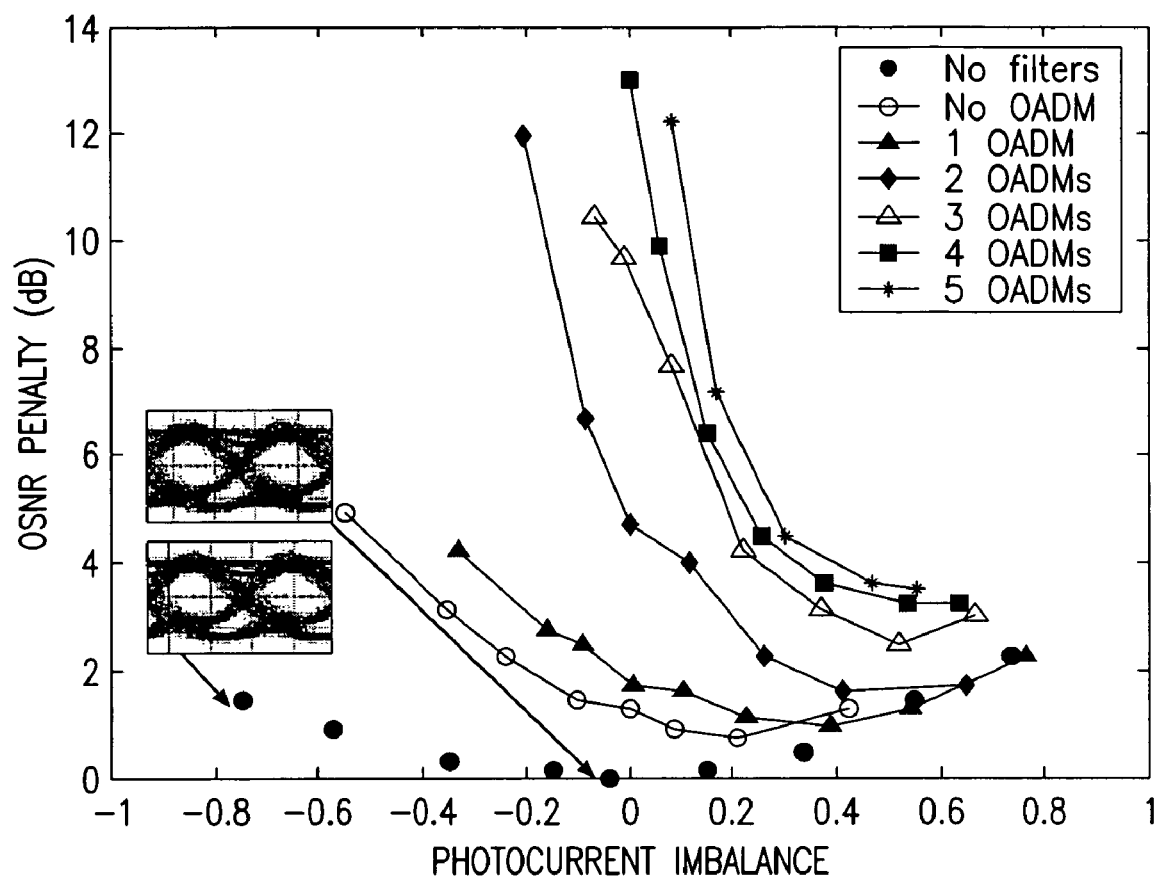
FIG. 5 is a plot showing OSNR penalty vs. photocurrent imbalance for various OADM concatenations.

The OSNR penalty at a BER of $10^{-3}$ was defined as: $OSNR_{Req}$ after filtering—back-to-back (No-filter) $OSNR_{Req}$ with perfectly balanced detection. The OSNR penalty is shown as a function of the photocurrent imbalance ($\beta_I$) in FIG. 5 and is effectively minimized for positive values of $\beta_I$. The OSNR penalty at a BER of $10^{-3}$ was 3.2 dB after four OADM nodes for an imbalance $\beta_I$ of +0.55 as opposed to 13 dB with balanced detection ($\beta_I$=0). It can be seen from FIG. 5 that the OSNR penalty rises rapidly for negative $\beta_I$ as the number of OADM concatenations increase. Also, as the distortion due to tight filtering increases the receiver 257 performance gets more sensitive to any imbalance (as compared to the unfiltered case).

Those skilled in the art will appreciate that the methods and apparatus disclosed herein can be used with various other modulation formats that are beneficially decoded using balanced detection, including but not limited to DPSK, CSRZ-DPSK, differential quadrature PSK (DQPSK), frequency shift keying (FSK), polarization shift keying (PoISK), minimum shift keying (MSK), and the like.

It will also be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for receiving at a receiver, a narrowband filtered optical phase shift keyed (PSK) signal, the method comprising the steps of:
   converting the PSK signal into first and second intensity-modulated signals; and
   mitigating performance degradation due to narrowband filtering, exhibited in an output signal representing the PSK signal, wherein said mitigating includes the steps of;
   introducing a desired amplitude imbalance between the first second intensity modulated signals;
   detecting the amplitude imbalanced first and second intensity modulated signals; and
   combining the detected amplitude imbalanced first and second intensity modulated signals into the output signal.

2. The method of claim 1, wherein introducing the desired amplitude imbalance is performed by altering the optical power of the first and the second intensity modulated signals through effect of at least one of an optical attenuator and an optical gain element.

3. The method of claim 1, wherein detecting the amplitude imbalanced first and second intensity modulated signals is performed in respective photodiodes.

4. The method of claim 1, wherein combining the detected amplitude imbalanced first and second intensity modulated signals is performed in a differential amplifier.

5. A method for receiving at a receiver, a narrowband filtered optical phase shift keyed (PSK) signal, the method comprising the steps of:
   converting the PSK signal into a first intensity-modulated signal and a second intensity-modulated signal respectively; and
   mitigating performance degradation due to narrowband filtering, exhibited in an output signal representing the PSK signal, wherein said mitigating includes the steps of;
   introducing a desired amplitude imbalance between the first and the second intensity modulated signals;
   detecting the amplitude imbalanced first and second intensity modulated signals; and
   combining the detected amplitude imbalanced first and second intensity modulated signal into the output signal,
   such that the introduced amplitude imbalance substantially reduces the optical signal-to-noise ratio of the PSK signal required for substantially error-free transmission.

6. The method of claim 5, wherein introducing the desired amplitude imbalance is performed by altering the optical power of the first and the second intensity modulated signals through effect of at least one of an optical attenuator and an optical gain element.

7. The method of claim 5, wherein detecting the amplitude imbalanced first and the second intensity modulated signals is performed in respective photodiodes.

8. The method of claim 5, wherein combining the amplitude imbalanced first and the second intensity modulated signals is performed in a differential amplifier.

* * * * *